Feb. 15, 1966     P. H. HILT     3,235,838
REMOTE-OPERATED RADIO RECEIVING APPARATUS
Filed March 30, 1960
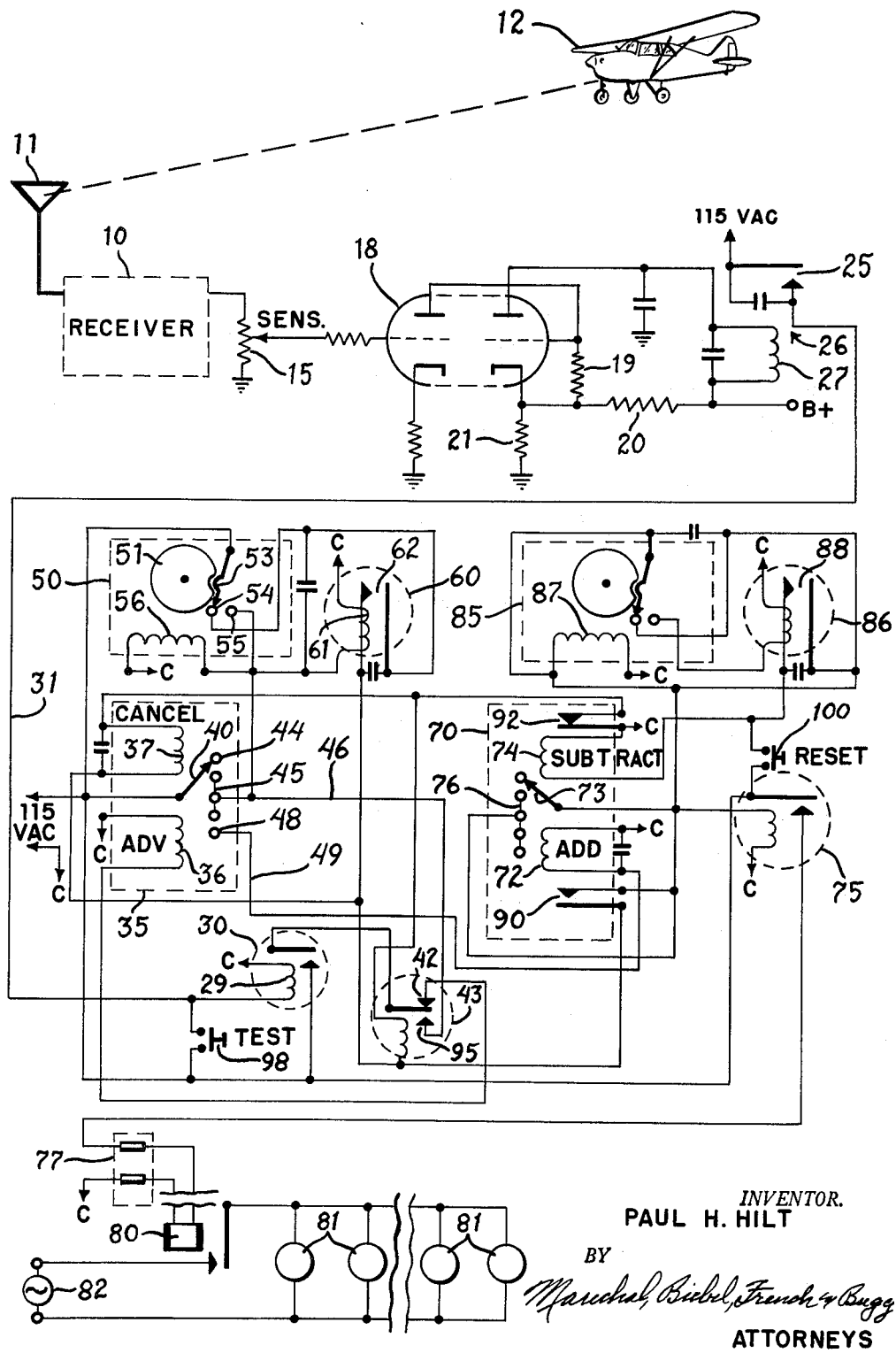
INVENTOR.
PAUL H. HILT
BY
Marshall, Biebel, French & Bugg
ATTORNEYS

United States Patent Office 3,235,838
Patented Feb. 15, 1966

3,235,838
REMOTE-OPERATED RADIO RECEIVING APPARATUS
Paul H. Hilt, Dayton, Ohio, assignor, by decree of distribution, to Juanita A. Hilt
Filed Mar. 30, 1960, Ser. No. 18,606
6 Claims. (Cl. 340—26)

This invention pertains to radio receivers and more particularly to a discriminating receiver for closing an electric circuit upon the occurrence of a particular signal.

The receiver of this invention has particular utility for use in the field of aviation where it is desired to control a circuit at a ground station by means of a signal transmitted from an aircraft. Such uses may be the control of runway lights, hangar doors, electrically operated valves, or any other use wherein it is desired to effect an electric circuit change in response to a signal from an aircraft transmitter.

The invention consists of a receiver which is tuned to receive a particular frequency of the transmitting aircraft, preferably but not necessarily in the VHF band. The apparatus is arranged to operate upon the occurrence of a predetermined number of relatively short pulses which are transmitted as by the process of "keying" the microphone button of the transmitter within a definite time period. The invention includes an arrangement for determining when the required number of pulses are received within such time period and for rejecting such pulses as may be received from a transmitter during normal conversation or chatter on the frequency.

When the invention is used for the purpose of turning on the runway lights at an airport, the apparatus may be arranged to operate upon the reception of a predetermined number of short transmissions, or pulses, on a predetermined frequency, to turn on the runway lights for a fixed period of time and then to extinguish the lights. Also, the apparatus preferably includes provision for increasing the period of time during which the circuit is held closed by the expedient of repeating the pulsing or keying operation. Thus, a person in an aircraft who is landing or preparing to take off, and finds that the runway lights are already lighted, can assure an additional period of operation by means of this time buying feature.

It is therefore a principal object of this invention to provide a discriminating receiver as outlined above for the control of an electric ground circuit remotely upon the occurrence of a particular signal from an aircraft transmitter.

A further object of this invention is to provide a ground receiver having a telemetering section responsive to the occurrence of a predetermined number of relatively short pulses of an aircraft transmitter within a predetermined short period of time, and operable to reject pulses not intended for the purpose of keying the receiver.

Another object of this invention is to provide a receiver as outlined above having provision for closing an electric circuit for a predetermined time interval and having further provision for increasing such time interval upon demand of a remote transmitter.

A still further object of this invention is to provide a remotely controllable receiver as outlined above adaptable for use in a wide variety of installations for effecting the operation ground circuits from aircraft without the necessity of modifying existing aircraft equipment.

A particular advantage of this invention resides in the fact that it is operable only upon demand of a potential user and is unaffected by the normal use of the aircraft transmitter such as carrying on a conversation. The arrangement of the unit to operate upon the reception of a particular code as by the keying of the transmitter provides a versatile unit characterized by ease of operation.

Another object of this invention is to provide a fully automatic device for turning on and extinguishing the runway lights at an airport upon demand of a potential user either from the ground or from the air without the necessity of attention by an airport operator and suitable for use by all aircraft equipped with ordinary aircraft VHF transmitters.

The single figure of the drawing is a wiring diagram of a unit constructed according to the teachings of this invention.

Referring to the drawing, which illustrates a preferred embodiment of this invention, a receiver portion 10 of the unit includes an antenna 11 and is arranged for the reception of a particular transmitted frequency from an aircraft 12. The receiver portion 10 is preferably of the VHF type for the reception of at least one of the allocated VHF frequencies, preferably a frequency which has been allocated for general use such as the aeronautical advisory, or UNICOM frequency. The electrical arrangement of the receiver portion of this invention may be constructed according to well-known techniques and preferably includes a crystal controlled local oscillator to eliminate drifting.

The receiver portion 10 of the unit is arranged to supply a D.C. output signal voltage upon the occurrence of a transmission of the unmodulated carrier from the aircraft transmitter, such as is transmitted when the transmitter is keyed or pulsed by the momentary depression of the microphone button. This receiver output signal, which may conveniently be generated at the second detector or AVC circuit, is applied to a potentiometer 15. The potentiometer 15 provides a sensitivity control for the unit and may be varied to adjust the reception characteristics as desired or necessary to be operated by aircraft on the ground or in the air at some predetermined or convenient range.

The output of the receiver portion 10 is applied through the control 15 to a D.C. amplifier including a dual triode tube 18. The halves of the triode are direct coupled so that the conduction of the first half holds the second half at cut-off by reason of the voltage drop across the grid resistors 19 and 20, and the cathode resistor 21. When the negative AVC signal is applied to the first half of the tube 18, the second half is caused to conduct sharply, coinciding with a carrier or pulse received in the portion 10.

The conduction of the tube 18 effects the closing of the contacts 25 of a sensitive relay 26 which has its coil 27 in the plate circuit of the output half of the tube 18. The closing of the contacts 25 applies power, such as 115 v. A.C., to operate the coil 29 of a heavier control relay 30 through a lead 31. The 115 v. power supply is shown as having a common lead indicated by the letter "C," and it is understood that such common circuit is preferably not grounded within the unit. The operation of the relay 30 from the output voltage of the receiver portion 10 provides a 115 v. input signal for the telemetering section of the receiver unit.

The unit contains pulse counting means connected for operation by the relay 30. The pulse counting means includes a stepping or counting relay 35 having an advance coil 36 and a release or cancel coil 37 operatively positioned to move a spring loaded arm of an integral selector switch 40. The energization of the advance coil 36 causes the selector switch 40 to advance one contact position for each time which the coil 36 is energized. The cancel coil 37 operates to release the switch 40 to return to a rest position, as shown. The advance coil 36 is connected for operation by the cotnrol relay 30 once for each pulse received by the portion 10 through the normally closed or back contact 42 of an override relay 43.

The initial pulse received from the aircraft transmitter causes the operation of the advance coil 36 to advance the arm of the selector switch 40 one position from the rest position 44 thereby selecting a first circuit indicated by the group of contacts 45 and the lead 46 connected in common therewith. Additional pulses of the aircraft transmitter eventually operates the advance coil 36 to close a second circuit path indicated by the final switch contact 48 and the control lead 49 provided all of the pulses have been received before the relay is cancelled. The number of active contacts 45 and 48 of the relay 35 corresponds to the number of pulses which are necessary from the transmitter within a predetermined time interval in order to cause the operation of the unit to close a ground circuit, such as a string of runway lights. In the illustrated embodiment, four of such contacts are shown and therefore four pulses are required in order to "trigger" the unit. The relay 35 preferably includes a mechanical stop which prevents selector switch movement beyond the contact 48.

The short time interval within which such a series of pulses must be transmitted is determined by a circuit including single revolution electric timer indicated at 50. The timer 50 includes a cam 51 which is arranged to make one complete revolution in each cycle of its operation. A single pole, double throw switch 53 is operated by the cam with a front normally closed contact 54 and a back holding contact 55 which closes to cause a cycle of operation of the timer 50. The timer 50 also includes a motor coil 56 which is connected to the lead to cause the timer to initiate operation upon the first pulse and to continue to operate in any advanced position of the stepping relay 35.

The timer means for resetting the counter relay upon the conclusion of a fixed time period also includes a thermal time delay relay 60. The relay 60 has a heater 61 which controls the closing of contacts 62 and is arranged in parallel with the timer motor 56 to operate concurrently with the timer. The contacts 62 are arranged in circuit with the front contacts 54 and the cancel coil 37.

The arrangement of the timer 50 and thermal relay 60 is such that the cancel coil 37 is momentarily energized through the contacts 62 of the thermal relay 60 at the conclusion of the operation of the timer. The thermal relay 60 provides a time delay, in the order of approximately two seconds, through which the cancel coil is operated at the conclusion of the running of the timer 50 to return the selector switch 40 to its initial or rest position 44. The switch 40 therefore is always returned to the rest position within a fixed time period after the reception of a given pulse and the period of operation of the timer 50, may, for example, be a period of five seconds.

If the required minimum number of pulses has been received prior to this cancellation of the relay 35, that is four pulses within the timer period of five seconds in this illustration, then a 115 v. signal voltage has been applied by the switch 40 to the control lead 49. The combination of the stepping relay 35, the timer 50 and the thermal relay 60 therefore comprises code discriminator means connected to the receiver unit for closing a control circuit upon each occurrence of a predetermined number of pulses from the transmitter within a predetermined short interval of time.

Counter means controlled by the control lead 49 for registering subsequent or repeat keyings of the transmitter includes an add-subtract stepping relay 70. The relay 70 includes an add coil 72 connected for energization by the final position of the stepping relay 35 and operates to advance a selector switch 73 one switch position. The add-subtract relay also includes a subtract coil 74 which is operable to subtract one position from the selector switch 73 upon each energization or pulsing thereof.

The movement of the selector switch 73 to any advanced position causes the energization of the coil of a relay 75 through the "on" switch contacts 76. The closing of the relay 75 applies output voltage in the form of 115 v. A.C. to an outlet receptacle 77. This signal is then used to close an appropriate remote electric circuit, such as the closing of the heavy duty relay 80 connected to operate a string of lights 81 from their power supply 82.

The movement of the selector switch 73 to the first or any other advanced "on" position 76 also initiates the operation of a second timer 85 and a thermal relay 86 arranged in a circuit similar to that of the timer 50 and the relay 60. The timer 85 and thermal relay 86 comprise subtract timer means or relay disconnect means operable to measure a time period for which the ground circuit is to be held closed. Such period may be chosen at any convenient valve, and for running light operation fifteen minutes has been found satisfactory.

The motor coil 87 of the timer 85 is energized concurrently with the advancing of the relay 75 to cause the timer 85 to make one complete revolution. The heater 88 of the thermal relay 86 is connected for concurrent operation with the motor coil 87 to close the contacts 88, which remain closed momentarily for a few seconds upon the completion of the timer run. Thus, the relay 86 may be a "five second" relay as compared to the two second hold of the relay 60 in view of the slower turning of the timer 85. The contacts 88 are connected to pulse the subtract coil 74 at the conclusion of the timed period.

A subsequent keying of the aircraft transmitter will operate through the stepping relay 35 to advance the selector switch 73 of the add-subtract relay 70 to a new position. It will be seen that four switch positions 76 are shown to provide for four consecutive time periods, if desired. The timer 85 is caused to operate continuously as long as the selector switch 73 is in any advanced position, and operates to pulse the subtract coil 74 upon the conclusion of each revolution thereof to move the selector switch 73 one position toward complete cancellation. When the selector switch 73 is returned to the rest position it opens the relay 75 to break the ground circuit.

It will therefore be seen that the portion of this invention thus far described is operable to close a ground circuit, such as the turning on of runway lights at a landing field, for a predetermined period of time and includes a time accumulation device by means of which the pilot can buy additional time merely by the expedient of repeating the keying operation.

The invention contains safeguards for assuring the proper and desired operating conditions over a variety of circumstances. A pair of normally open contacts 90 are operated independently by the add coil 72 and are connected to energize the cancel coil 37 of the relay 35 as a second cancellation circuit to assure that the relay 35 cancels and is ready for subsequent keying immediately upon the registration of one time unit by the relay 70. This permits the immediate rekeying for additional time without the necessity of waiting until the timer 50 has completed its cycle. As an example, a full hour of time in 15 minute intervals of the timer 85 can be recorded in this manner within a five second time period of the timer 50.

A normally closed safety contact 92 is arranged to be opened upon the energization of the subtract coil 74 and is connected in series with the cancel coil 37 of the relay 35. This contact 92 prevents the stepping relay 35 from being cancelled during the subtracting of one time unit by the timer 85 and the thermal relay 86. It is seen that the relay 86 will hold the subtract coil 74 energized for a number of seconds during which time it would be impossible for a pilot to buy additional time since the add coil of the relay 70 cannot override the energized subtract coil. Accordingly, by holding the cancel coil 37 open and thereby disabling the cancellation process, the selector switch 40 will remain on the contact 48 ready immediately to pulse in the new time period upon the opening of the thermal relay 86.

The override relay 43 operates to provide for subsequent keying operations irrespective of the fact that the thermal relay 60 may not have opened due to heating from previous keying. Its coil is in parallel with the cancel coil 37, and its front contact 95 is therefore closed when the cancel coil 37 is energized. The advance coil of the stepping relay 35 is not operable to override its cancel coil. The contact 95 of the relay 43 by-passes the advance coil and energizes the timer 50, thereby releasing the cancel coil 37 and permitting the operation of the advance coil in the normal manner.

The override relay has the additional function of providing for the cancellation of the relay 35 under the circumstances when a normal conversation, or other use of the frequency, causes two pulses in rapid succession, then a long third pulse beyond the running of the timer 50, as during a conversation. Under these circumstances, the advance coil 36 is held energized and the completion of the cycle by the timer 50 resulting in the energization of the cancel coil 37, would not be effective to override the energized advance coil. The override relay 43 therefore provides for the continued operation of the timer 50 until the conclusion of the conversation, at which time the completion of the timer's cycle will be effective to return the selector switch 40 to its rest position.

The apparatus of the invention includes means for determining the operativeness of the telemetering circuit without the necessity of keying an aircraft transmitter. This consists of a test push button 98 connected in parallel with the contacts 25 of the sensitive relay 27. The button 98 is therefore operable to apply power to the coil 29 of the control relay 30 in the same manner as if a pulse had been received by the receiver portion 10. Such push button is preferably mounted on a front panel of the unit in order that an operator may press it the required number of times within the predetermined short time period to close the ground circuit in the manner described above, thereby determining the operativeness of the circuit.

The apparatus also includes reset means for use in conjunction with the test button 98 for the purpose of opening the ground circuit, when desired, through the add-subtract relay 70. This consists of a reset button 100 arranged to energize the subtract coil 74 upon the depression thereof, to subtract one unit on the selector switch 73 for each depression thereof. Accordingly, the rest button 100 may conveniently be used to open the ground circuit upon the completion of a test of the circuit by means of the test button 98.

The operation of the apparatus of this invention is largely self-evident from the foregoing description. It will be seen that the invention provides a reliable code discriminating receiver for accomplishing a large number of tasks which can be conveniently commanded from an aircraft. It is understood that the invention may be simplified in instances where the apparatus is to be used for opening a hangar door or for closing a valve on a pipe line, where the time buying feature is not important, by the omission of the add-subtract relay 70 and by using the timer to open the coil of the relay 75.

It is also apparent that the apparatus is suitable for use with a greater or fewer number of pulses than those described in connection with the specific example of four pulses, and the predetermined time interval within which such pulses must be received may be lengthened or shortened accordingly, as desired, by the selection of a suitable timer 50. Also, the time period during which the ground circuit is held closed by the timer 85 may be suitably modified, as desired, without departing from the spirit of this invention. In addition, the timer 85 and the thermal relay 86 may be omitted altogether in circumstances where it is desired merely to close a ground circuit, such as where the apparatus is used for emergency stand-by to close a power line, an alarm, or a valve.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An automatic runway lighting system for turning on and extinguishing the lights of an airport runway upon the reception of a predetermined number of short unmodulated carrier pulses in excess of two from an ordinary aircraft voice communication transmitter within a fixed time period comprising a radio receiver tuned to the frequency of said transmitter and operable to provide an output voltage during the reception of one of said unmodulated carrier pulses transmitted by said transmitter, resettable pulse counting means connected for operation upon the occurrence of said voltage to effect a first circuit change upon the occurrence of the first of said pulses and operable to effect a second circuit change upon the occurrence of the final one of said predetermined number of pulses within said fixed time period, counter cancellation means including a timer for measuring said time period and initiated upon the occurrence of said first circuit change only and being unaffected by any further said circuit changes and connected to said counter means to reset said counter means at the conclusion of said fixed time period irrespective of the position of said counter means, a runway light circuit closing relay operable in response to said second circuit change to turn on said runway lights, and a second timer operable to open said relay to extinguish said lights upon the conclusion of a time period longer than the period measured by said first timer.

2. An automatic runway lighting system for turning on and extinguishing the lights of an airport runway upon the reception of a predetermined number of short unmodulated carrier pulses in excess of two from an ordinary aircraft voice communication transmitter within a fixed time period comprising a radio receiver tuned to the frequency of said transmitter and operable to provide an output signal upon the reception of one of said carrier pulses, a stepping relay having a stepping coil connected to receive said signal and operable to close a first circuit upon the occurrence of the first of said pulses and operable to close a second circuit upon the occurrence of the final one of said predetermined number of pulses within said fixed time period, counter cancellation means including a timer for measuring said time period and having a duration corresponding to said period and connected to be initiated upon the close of said first circuit to reset said stepping relay at the conclusion of said fixed time period irrespective of the position of said stepping relay, runway light circuit closing relay means operable upon the occurrence of said second circuit change to turn on said runway lights, and relay disconnect means including a second timer of relatively long duration as compared to said first timer and connected to be initiated upon the closing of said second circuit to open said relay means to extinguish said lights upon the conclusion of a longer time period.

3. A receiver unit for closing a ground circuit in multiples of a fixed time period upon command of an aircraft transmitter, comprising a radio receiver tuned to a fixed frequency and operable to provide an output signal upon the reception of a carrier wave from such transmitter, a stepping switch relay having an advance coil connected to move a switch contact thereof one position from a rest position for each occurrence of an output signal of said receiver and a cancel coil operable to return said contact to said rest position, cancellation timer means including an electric timer having contacts in circuit with said cancel coil and being energized upon the selection by said stepping relay of a first advance position only and operable to return said relay to said rest position upon the conclusion of a first and relatively short time period, an add-substract relay having a plurality of sequentially selectable switch positions and an add coil connected for energization by said stepping relay upon the occurrence of a predetermined advanced position of said stepping relay within said short time period to advance one of said selectable positions, said add-substract relay further having a subtract coil operable to subtract one of said selectable switch positions upon each pulsing thereof, subtract timer means including a second timer for measuring a second time period of longer duration than said first time period and connected for continuous operation as long as said add-subtract relay is in an advanced position and having contacts connected in circuit with said subtract coil to subtract one said selectable position from said add-substract relay for each such second time period, and means connected to said add-substract relay for closing said ground circuit and holding said circuit closed as long as said second timer is operating.

4. A radio ground receiver adapted for operation on an aviation communication voice frequency for closing an electric circuit upon receipt of the concluding pulse of a series of keyed unmodulated pulses of predetermined number received within a predetermined short time period from an ordinary aircraft voice transmitter on said frequency and for opening said circuit after a predetermined longer time period and being unaffected by voice communication or other usage of said communication frequency, comprising a receiver tuned to said frequency and having a detector providing a signal upon the reception of an unmodulated transmission of a carrier wave on said frequency, a resettable pulse counter having a series of intermediate positions followed by a final position with the total of said positions followed by a final position with the total of said positions corresponding in number to said predetermined number of pulses, said counter connected for operation on the occurrence of one of said pulses signaled at said detector for advancing one of said positions for each occurrence of said signal until the selection of said final position, circuit closing means connected for operation only by said counter selecting said final position for closing said electric circuit, first electric timer means having a timing cycle correspondinng to said short time period connected for initiation of a time-out sequence concurrently with the reception of the first detected pulse of said series of pulses and operable to reset said counter at the conclusion of said short time period irrespective to the position then occupied by said counter and being unaffected by said pulse counter obtaining any of said immediate positions prior to the end of its timing cycle, and second electric timer means having a substantially longer time out sequence than said first timer means corresponding to said longer time period and connected for operation only upon the operation of said circuit closing means concurrently with the selection of said final position by said counter to release said circuit closing means to open said circuit upon the conclusion of said longer time period.

5. The receiver of claim 4 having a further circuit including a closable manual switch connected to simulate the reception of said pulses and advancing said pulse counter one position for each operation of said switch in said predetermined short time period for operating said circuit closing means.

6. The receiver of claim 4 further including a manually operable reset switch connected for releasing said circuit closing means prior to the termination of the time period of said second timer means.

References Cited by the Examiner

UNITED STATES PATENTS

| | | | |
|---|---|---|---|
| 1,815,045 | 7/1931 | Boddie. | |
| 2,346,889 | 4/1944 | Wullschleger. | |
| 2,697,823 | 12/1954 | Undy. | |
| 3,020,522 | 2/1962 | Lesher | 340—33 |
| 3,117,299 | 1/1964 | Lemm et al. | 340—26 |
| 3,121,857 | 2/1964 | Lemm et al. | 340—25 |

THOMAS B. HABECKER, *Acting Primary Examiner.*

BENNETT G. MILLER, STEPHEN W. CAPELLI, NEIL C. READ, *Examiner.*